United States Patent [19]
Whipple et al.

[11] Patent Number: 5,481,945
[45] Date of Patent: Jan. 9, 1996

[54] LOCK PLATE ADJUSTMENT FOR GENEVA DRIVE MECHANISM

[75] Inventors: Richard L. Whipple; Larry W. Forbus, both of Keene, N.H.

[73] Assignee: Kingsbury Corporation, Keene, N.H.

[21] Appl. No.: 152,186

[22] Filed: Nov. 15, 1993

[51] Int. Cl.⁶ .................................................. B23Q 16/02
[52] U.S. Cl. ........................... 74/820; 409/221; 409/198; 33/569; 33/DIG. 8; 74/436
[58] Field of Search ..................... 74/820, 436; 409/221, 409/198, 172, 173; 33/569, DIG. 8, 613, 614, 623

[56] References Cited

U.S. PATENT DOCUMENTS 4,918,826  4/1990  Moore et al. ...................... 409/221 X

*Primary Examiner*—Charles A. Marmor
*Assistant Examiner*—Mary Ann Battista
*Attorney, Agent, or Firm*—Samuels, Gauthier & Stevens

[57] ABSTRACT

A machine tool has a rotatable table with a plurality of lock plates located on the underside thereof at circumferentially spaced locations, and a geneva drive mechanism arranged to coact with the lock plates in rotatably indexing the table. The lock plates are shiftable with respect to the table by means of cooperating pairs of rotatably adjustable eccentric pins. Machine screws releasably fix the lock plates at selected positions of adjustment. The lock plates are shifted and releasably fixed from above the table.

10 Claims, 4 Drawing Sheets

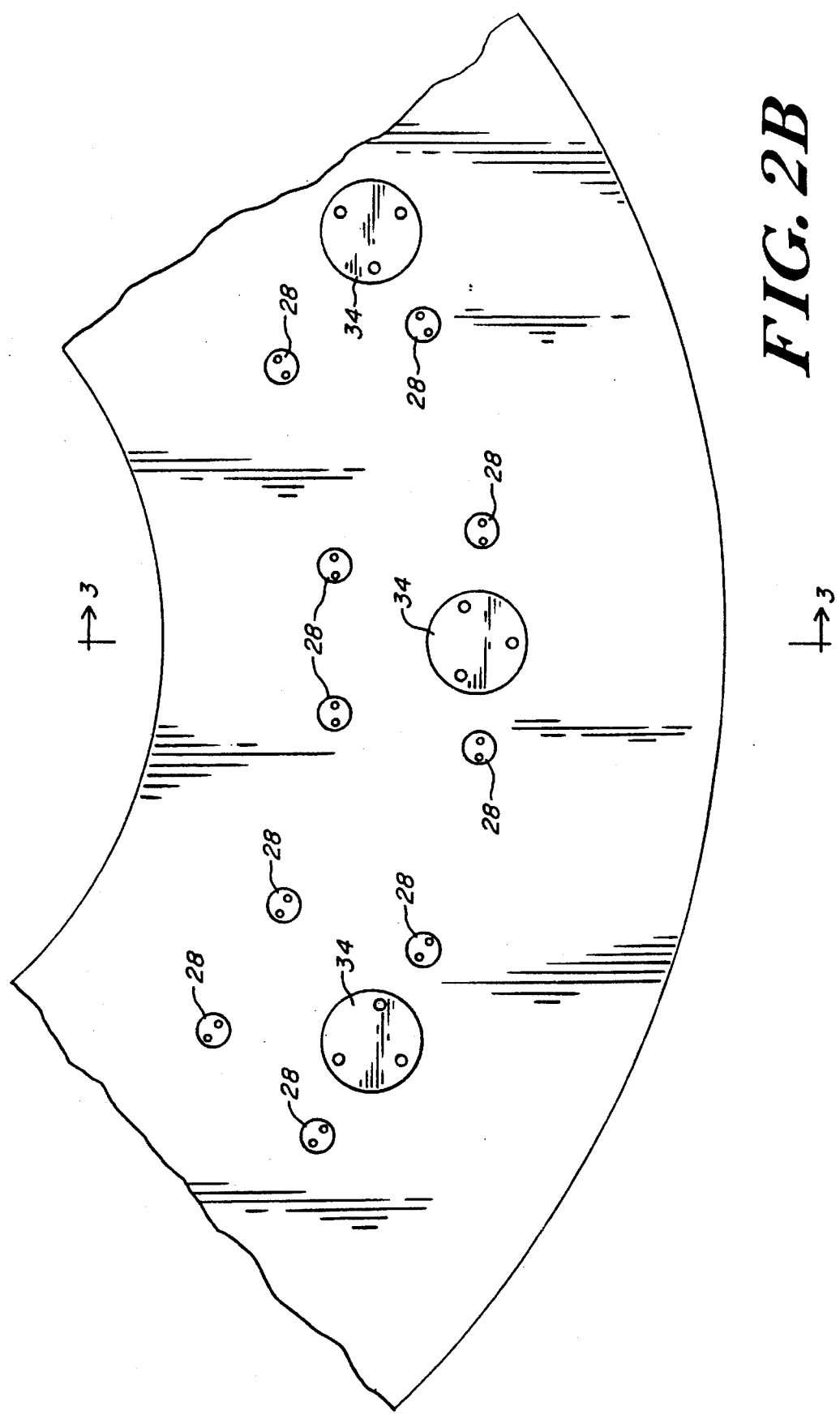

LOCK PLATE ADJUSTMENT FOR GENEVA DRIVE MECHANISM

BACKGROUND OF THE INVENTION

1. Field of the Invention

This invention relates generally to machine tools of the type having tables which are rotatably indexed by geneva drive mechanisms, and is concerned in particular with an improvement in the positioning of the lock plates of such mechanisms in order to achieve optimum indexing accuracy.

2. Description of the Prior Art

Examples of known geneva drive mechanisms are disclosed in U.S. Pat. Nos. 1,975,008 (Kingsbury); 2,011,486 (Kingsbury); 2,021,030 (Swahnberg); 3,750,494 (Rice); and 4,918,826 (Moore et al).

In drive mechanisms of this type, and as is best illustrated for example in the Moore et al '826 patent, the lock plates are conventionally located on the underside of the rotatable table by locating pins or dowels. When setting up the machine to achieve accurate positioning of each work station at the desired angular location, the positions of the lock plates must often be readjusted with respect to the table. This in turn requires replacement of the existing dowels with substitutes that have been carefully machined to effect the required lock plate adjustment. This is a time consuming procedure, which may require several repetitions before finally achieving an acceptable degree of accuracy.

The objective of the present invention is to facilitate set up procedures by providing a means for more efficiently and readily adjusting the positions of the lock plates with respect to the table.

SUMMARY OF THE INVENTION

In accordance with the present invention, the lock plates are movably positioned on the underside of the table by means of cooperating pairs of rotatably adjustable eccentric pins. Machine screws releasably fix the lock plates at selected positions of adjustment. Both the eccentric pins and the machine screws are accessible from above the table.

BRIEF DESCRIPTION OF THE DRAWINGS

FIG. 2B is a top plan view of that portion of the table illustrated in FIG. 2A;

DETAILED DESCRIPTION OF PREFERRED EMBODIMENT

Figure 4:
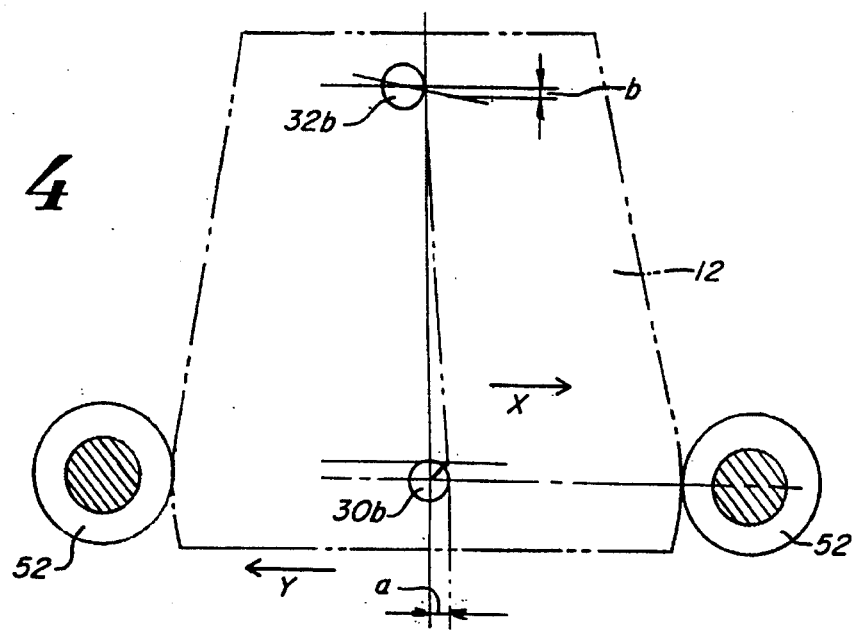
FIG. 4 is a diagrammatic representation depicting the positional and angular relationships of the eccentric pins associated with each locking plate.
Figure 1:
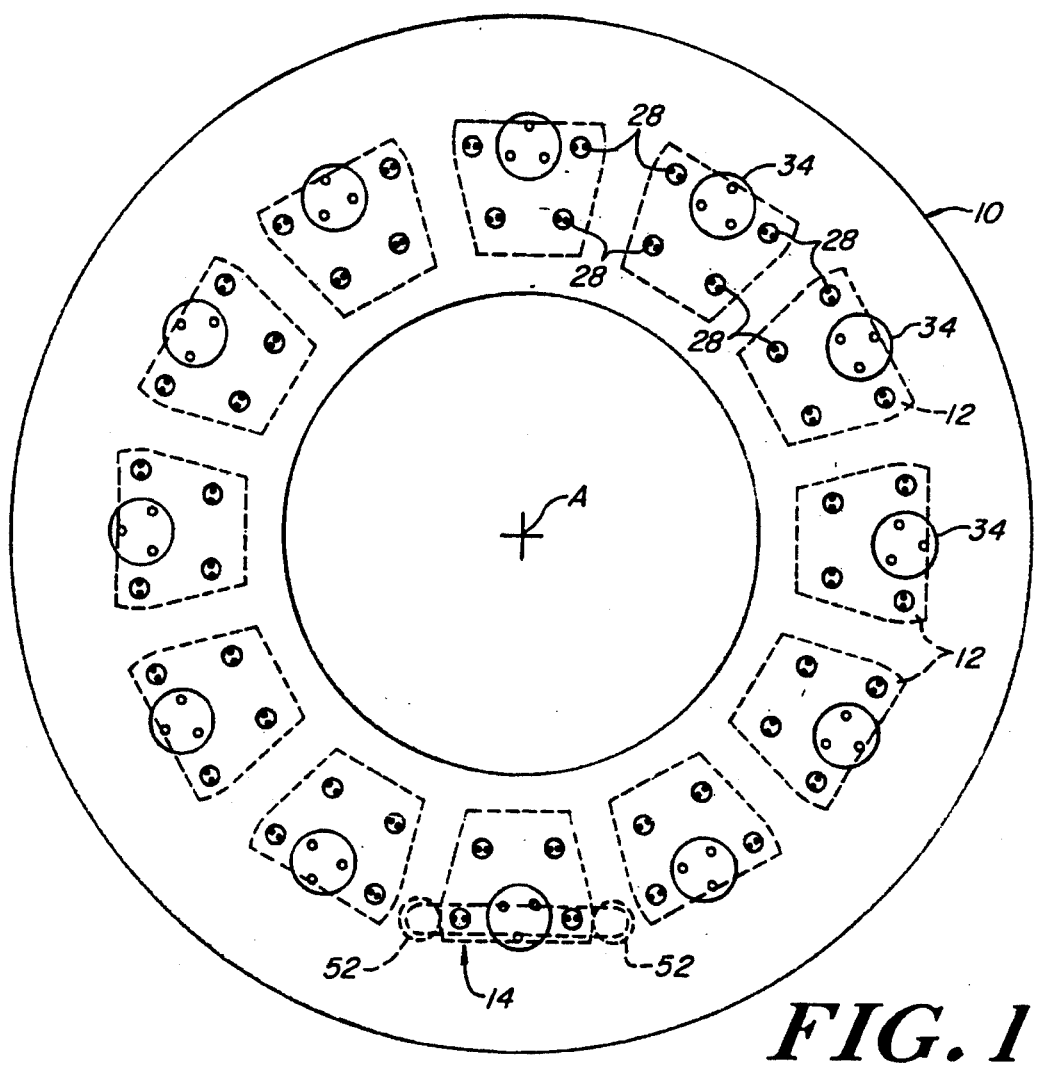
FIG. 1 is a top plan view of the rotatable table of a machine tool with lock plates located at circumferentially spaced stations on the underside thereof.
Figure 2A:
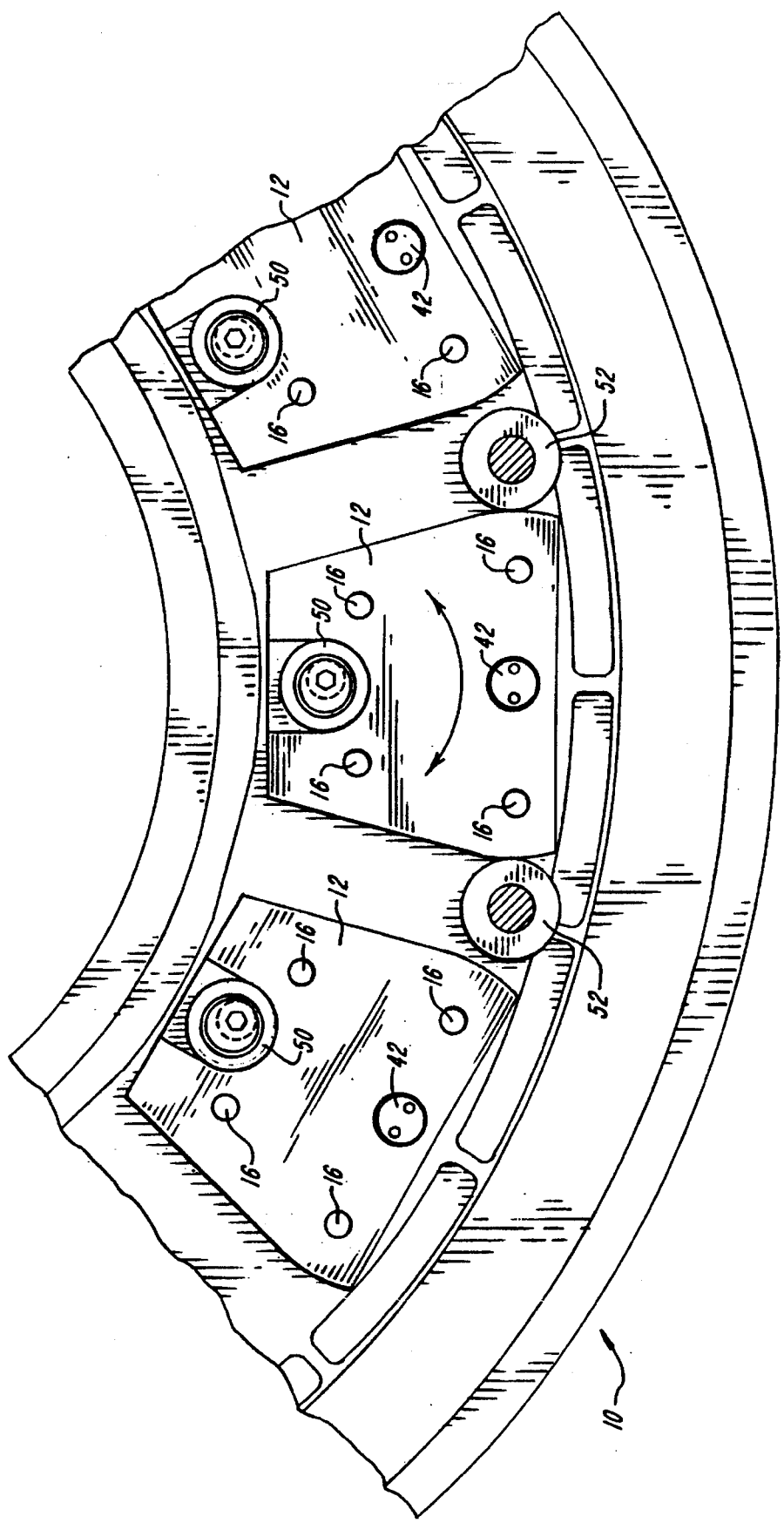
FIG. 2A is an enlarged bottom view of a portion of the table shown in FIG. 1.
Figure 3:
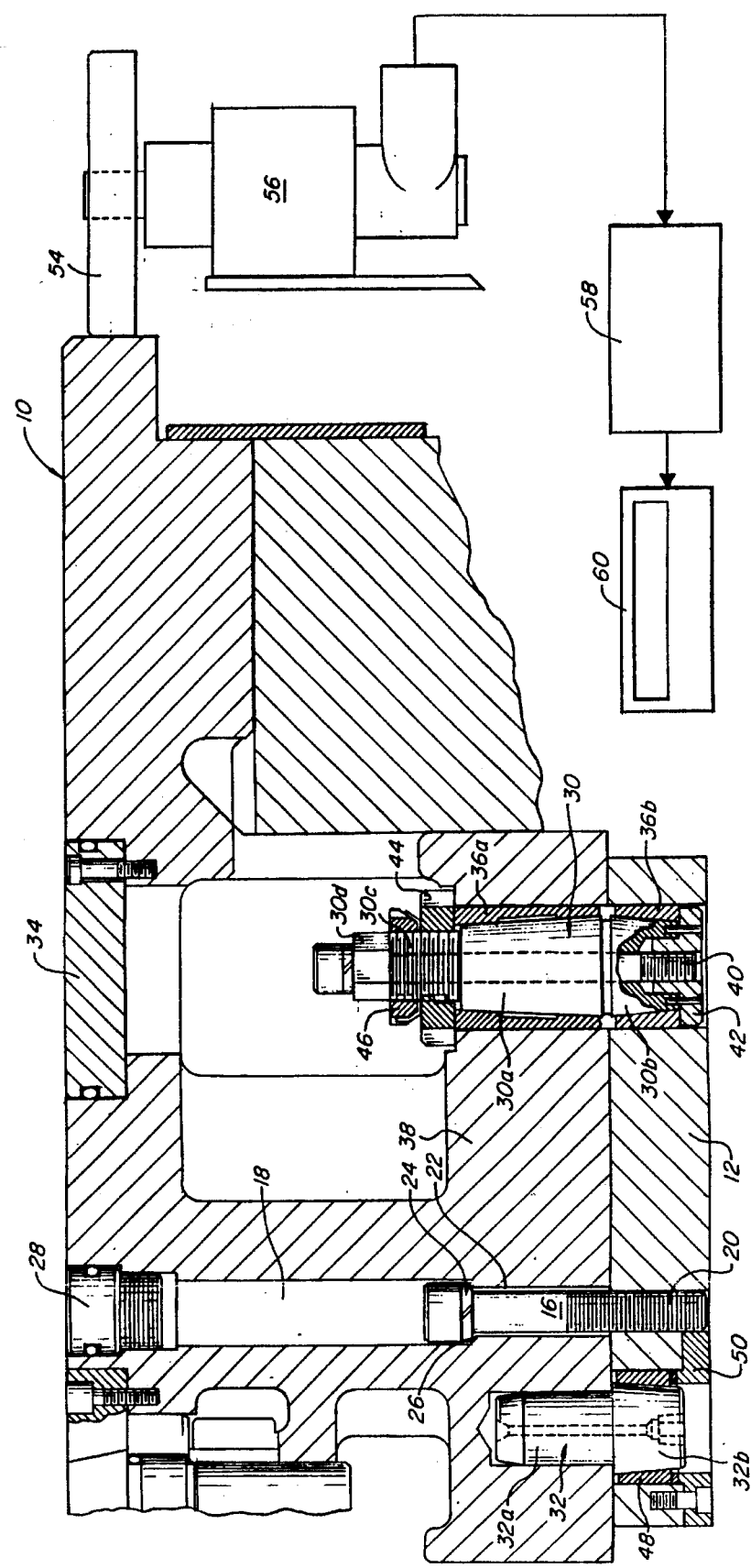
FIG. 3 is a sectional view on an enlarged scale taken along line 3-3 of FIG. 2B.

With reference initially to FIG. 1, the multi-station turret table of a conventional machine tool is shown at 10. Table 10 is mounted for rotation about axis "A", and has a plurality of lock plates indicated typically at 12 located on its underside at circumferentially spaced stations. A geneva drive mechanism 14 is arranged to coact with the lock plates 12 in rotatably indexing the table 10 about axis A. Such turret tables and their associated lock plates and geneva drives are well known to those skilled in the art, as evidenced by the patents referred to previously, the disclosures of which are herein incorporated by reference.

Referring now to the remaining drawings, it will be seen that each lock plate 12 is releasably secured to the underside of the table 10 by machine screws 16 located in stepped through bores 18. The screws are threaded into the lock plates as at 20. Slight clearances are provided at 22, and lock washers 24 are interposed between the heads of the screws 16 and the circular steps 26 of the bores. Removable plugs 28 close off the top ends of the bores at the table surface.

The position of each lock plate with respect to the table is governed by a cooperating pair of mutually spaced first and second eccentric pins 30 and 32. Pin 30 is accessible from above the table by means of a port closed by a removable cap 34. Pin 30 has upper and lower oppositely configured truncated conical sections 30a, 30b, each journalled for rotation in a respective collet 36a, 36b. The lower pin section 30b is arranged eccentrically with respect to the upper section 30a. Collet 36b is located in a bore in the lock plate 12, and collet 36a is likewise located in a bore in a web 38 of the table 10. A machine screw 40 extends axially through the pin 30 and is threaded at its bottom end into an end cap 42 which retains the lower collet 36b in place on the lower truncated conical section 30b of the pin 30. Pin 30 has an externally threaded section 30c leading from upper conical section 30a to a hex head 30d. An adjusting nut 44 is threaded onto pin section 30c and is releasably locked by means of an associated lock nut 46.

The second eccentric pin 32 has a cylindrical section 32a rotatably journalled in a blind bore in table web 38, and an eccentric truncated conical section 32b journalled in a collet 48 received in a bore in the lock plate 12. Collet 48 is held on the pin 32 by a retainer cap 50 secured to the lock plate. The eccentricity of pin section 32b exceeds that of pin section 30b, with pin section 32b being 90° out of phase with respect to pin section 30b.

The lock plate 12 is releasably fixed with respect to the underside of the table 10 by tightening the screws 16 and the adjusting nut 44. As the adjusting nut 44 is tightened, the collets 36a, 36b are pulled together into a tightly wedged relationship which frictionally prevents pin 30 from rotating. Locknut 46 is then tightened to prevent loosening of adjusting nut 44. As the screws 16 are tightened, the lock plate 12 is frictionally immobilized against the underside of the table web 38, while at the same time urging the collet 48 into a tightly wedged relationship which frictionally prevents rotation of pin 32. The locknut 44 and screws are accessible from the top of the table via ports which are then closed off by the cap 34 and plugs 28.

If a particular lock plate requires adjustment, it is first positioned between the crank rollers 52 of the geneva drive mechanism. After removing the cap 34 and plugs 28, the lock nut 46, adjusting nut 44 and screws 16 are loosened by tools reaching down from above the table. This loosens the collets 36a, 36b on pin 30 as well as the collet 48 on pin 32. By applying a wrench to hex head 30d and rotating pin 30, the lock plate 12 is moved with respect to the table in direction "x" by an increment "a", resulting in movement of the table in direction "Y" with respect to the geneva crank rollers 52. The eccentric portion 32b of pin 32 rotates to accommodate the shifting movement "b" of the lock plate.

Table adjustment may be monitored by a friction roller 54 operating through an encoder 56, a computer 58 and a digital display 60. Once the appropriate adjustment has been achieved, the adjusting nut 44, lock nut 46 and screws 16 are tightened, and the cap 34 and plugs 28 replaced. This procedure can be repeated for any one or all of the lock plates.

We claim:

1. A machine tool having a rotatable table with a lock plate located on the underside thereof at at least one of a plurality of circumferentially spaced stations, and a geneva drive mechanism arranged to coact with said lock plate in the rotational indexing of said table about a central axis, the improvement comprising:

a pair of mutually spaced first and second locating pins at the said at least one station, said first and second locating pins being rotatable about axes fixed with respect to said table and being provided respectively with first and second eccentrics, said first and second eccentrics being out of phase with respect to each other and being journalled for rotation in said lock plate;

adjustment means for rotating said first locating pin and its said first eccentric to shift said lock plate in relation to said table, the shifting of said lock plate being accommodated by a reactionary rotation of said second locating pin and its said second eccentric; and securing means for releasably fixing said first and second locating pins against rotation and said lock plate against shifting with respect to said table.

2. The machine tool of claim 1 wherein said adjustment means and said securing means are accessible from the top of said table.

3. The machine tool of claim 1 wherein the eccentricity of said second eccentric exceeds the eccentricity of said first eccentric.

4. The machine tool of claim 1 wherein said first and second locating pins are journalled for rotation with respect to said table about axes aligned radially with respect to the central axis of said table.

5. The machine tool of claim 1 wherein said first locating pin has axially spaced oppositely configured upper and lower first truncated conical sections, and upper and lower first collet means for journalling said upper and lower first truncated conical sections for rotation respectively in said table and said lock plate.

6. The machine tool of claim 5 wherein said securing means includes means for axially displacing said upper and lower first collet means between axially expanded loosened positions accommodating rotation of said first locating pin, and axially contracted positions frictionally resisting rotation of said first locating pin.

7. The machine tool of claim 5 wherein said first eccentric is defined by said lower first truncated conical section.

8. The machine tool of claim 7 wherein said second eccentric is defined by a second truncated conical section on said second locating pin, said second truncated conical section being journalled for rotation in said lock plate by second collet means.

9. The machine tool of claim 8 wherein said securing means includes connecting means adjustable between a loosened state accommodating movement of said lock plate relative to said table, and a tightened state fixing said lock plate to said table.

10. The machine tool of claim 9 wherein said second collet means is adjustable between a loosened position accommodating rotation of said second locating pin when said securing means is in its said loosened state, and a tightened position frictionally resisting rotation of said second locating pin when said securing means is in its said tightened state.

* * * * *